United States Patent
Gineste

(10) Patent No.: US 8,798,068 B2
(45) Date of Patent: Aug. 5, 2014

(54) METHOD AND SYSTEM FOR AN OPTIMIZED RETRANSMISSION OF A MESSAGE IN A SATELLITE COMMUNICATIONS CONTEXT

(71) Applicant: THALES, Neuilly-sur-Seine (FR)

(72) Inventor: Mathieu Gineste, Toulouse (FR)

(73) Assignee: Thales, Neuilly sur Seine (FR)

( * ) Notice: Subject to any disclaimer, the term of this patent is extended or adjusted under 35 U.S.C. 154(b) by 97 days.

(21) Appl. No.: 13/721,823

(22) Filed: Dec. 20, 2012

(65) Prior Publication Data

US 2013/0155836 A1 Jun. 20, 2013

(30) Foreign Application Priority Data

Dec. 20, 2011 (FR) .................................. 11 03944

(51) Int. Cl.
- *H04L 12/28* (2006.01)
- *H04L 12/56* (2006.01)
- *H04B 7/155* (2006.01)

(52) U.S. Cl.
CPC ............ *H04L 45/28* (2013.01); *H04B 7/15528* (2013.01); *H04L 47/10* (2013.01)
USPC ........... 370/392; 370/401; 370/348; 370/316; 370/349; 370/252; 455/12.1

(58) Field of Classification Search
None
See application file for complete search history.

(56) References Cited

U.S. PATENT DOCUMENTS

| | | | |
|---|---|---|---|
| 5,838,668 A | | 11/1998 | Okada et al. |
| 6,058,307 A | * | 5/2000 | Garner .......................... 455/428 |
| 6,411,806 B1 | * | 6/2002 | Garner et al. ................. 455/428 |
| 2004/0179506 A1 | | 9/2004 | Padovani et al. |
| 2014/0022983 A1 | * | 1/2014 | Ravishankar et al. ........ 370/316 |

FOREIGN PATENT DOCUMENTS

| | | |
|---|---|---|
| FR | 2956935 A1 | 9/2011 |
| WO | 2011/104114 A2 | 9/2011 |

* cited by examiner

*Primary Examiner* — Duc C Ho

(74) *Attorney, Agent, or Firm* — Baker Hostetler LLP

(57) ABSTRACT

A communications method for retransmission of at least one fragment of a lost or erroneous message from a terminal to a gateway over a communications network comprising a plurality of terminals, communicating over a demand assignment multiple access and comprising a control center allocating the communications resource to the terminals, comprises: detection, by the gateway, of fragments of lost or erroneous messages and, when at least one fragment is detected, notification via the gateway to the control center of the loss of at least one fragment; calculation, by the control center, of a second allocation plan taking into account a new transmission of the fragment; notification by the gateway to the terminal of the loss of the fragment and notification by the control center to the terminal of the second allocation plan; transmission by the terminal of the lost fragment according to the second allocation plan to the gateway.

17 Claims, 3 Drawing Sheets

METHOD AND SYSTEM FOR AN OPTIMIZED RETRANSMISSION OF A MESSAGE IN A SATELLITE COMMUNICATIONS CONTEXT

CROSS-REFERENCE TO RELATED APPLICATION

This application claims priority to foreign French patent application No. FR 1103944, filed on Dec. 20, 2011, the disclosure of which is incorporated by reference in its entirety.

FIELD OF THE INVENTION

The field of the invention relates to communications using a sharing of the resource based on a multiple access on demand of the DAMA (Demand Assignment Multiple Access) type and, in particular, satellite communications.

BACKGROUND

The sharing of a communications resource based on a demand assignment multiple access allows this resource to be assigned to a user wishing to transmit data by means of this resource, without using it continuously. This technique allows a limited resource to be shared between many users accessing this resource at the same time. Such a resource is managed by an allocation plan assigning time slots to the users, according to their needs, so as to allow them to access the resource. When a user wishes to transmit data, he initially sends a request for capacity in order to reserve the communications resource needed for the transmission of the message. An allocation plan is generated periodically so as to take into account the requests for capacity from the various clients.

FIG. 1 shows an aeronautical communications system between aircraft 11.1, 11.2, 11.3, 11.4 and a gateway 12. The system uses a satellite communications resource, known as a return channel resource allowing messages to be transmitted from the aircraft 11.1, 11.2, 11.3, 11.4 to the gateway 12. Each of the aircraft 11.1, 11.2, 11.3, 11.4 comprises onboard applications and a terminal for communicating with the gateway 12. The messages sent by the aircraft are associated with services. The following may for example be mentioned: the service COTRAC (acronym for Common Trajectory Coordination) which allows the pilot and the air traffic controller to coordinate the trajectory of the aircraft in real time. A message from a service, which has a certain size, is associated with a priority and an end-to-end timing requirement of the communications network.

The satellite communications resource is based on a demand assignment multiple access. The communications system also comprises a control centre NCC 13 (NCC for Network Control Centre) responsible for sharing the satellite communications resource between the aircraft (whose number can be higher than several thousands).

The gateway 12 transmits the messages to a terrestrial network ATN connecting airline operational centres AOC (acronym for Airline Operational Control) and air traffic controllers connected to the air traffic management network via air navigation service providers ANSP (acronym for Air Navigation Service Provider).

In the framework of safety communications, in other words those requiring a high level of integrity and reliability but also having stringent timing requirements for some of them, the period of time required for the retransmission of lost messages or fragments of messages can lead to the non-compliance with these timing requirements. Indeed, the losses of packets are non-negligible over a return path aeronautical channel and these losses in the case of a demand assignment access lead to retransmission times incompatible with the timing requirements of the safety applications.

In aeronautical communications, the quantity of messages generated per user is low but the timing requirements are strict and a limited resource is shared by a large number of users. Indeed, it is necessary to receive 95% to 99% of the messages from a given service within a limited time (a 1.4 s period at 95% for the most demanding services in the control of air traffic). Moreover, a demand assignment multiple access (DAMA) leads to a significant additional delay over and above the time for detection of a loss of message (or fragment) due to the process of request/allocation for the data to be retransmitted. This additional delay may easily lead to the non-compliance with the timing requirements of the safety services and potentially to a non-optimum use of the satellite resource.

Furthermore, in the known technical solutions, the coupling of the mechanisms for detection and for retransmission of the data with the management of the resources is limited to an evaluation of the number of lost data values in a terminal in order to adapt the power, the modulation and/or the coding used by a terminal but does not affect the allocation of the resources in the case of a demand assignment multiple access of the DAMA type.

Other solutions allow the quantity of information to be retransmitted in the case of lost data to be reduced thanks to the use of optimized codes. These solutions can allow the number of errors over the channel to be limited or fewer resources to be used for the retransmission of the data, but they do not solve the problem of the delay induced by the necessary retransmissions which is a particular problem for safety communications, notably with regard to the communications for management of the air traffic which have very demanding time constraints for all of the messages of their service. However, these solutions could be used where necessary as a complement to the solution provided.

In the case of systems of the DVB-S2/RCS (for Digital Video Broadcasting-Satellite/Return Channel via Satellite) type with very low packet loss rates (in particular DVB-S2), where the channel is of a virtually error-free type, the mechanisms for error detection and for retransmission are not generally used over the satellite link and the data losses over the channel are generally recovered by the higher levels, where this is necessary (transport, applications levels). This solution is not optimum in the context of the safety communications because, in this context, the packet error rates are much higher and the problem of the retransmission time for the data is not solved by this type of solution, and it is even made worse given that the detection and the retransmission take place from end-to-end (potentially involving the non-compliance with the timing requirements of the safety services).

Generally speaking, broadband telecommunications systems are known. These systems provide a user supported data rate and the possibility of preempting a data value to be retransmitted over a resource already allocated. If the channel is virtually error-free, the retransmission is not taken into account by the system but is implemented from end to end (by the application or the transport level where necessary). This solution is not applicable to the context of safety communications because the traffic profile differs; indeed, the traffic considered in aeronautical communications is not a supported traffic (as it can be in telecommunications). Moreover, the retransmission time would be made worse by an end-to-end processing, as has been previously mentioned.

Another family of solutions consists in using a random access to the resource which allows the predetermination of the time for request/allocation of the resource for a demand assignment access (DAMA). This type of access will introduce a much higher packet error rate in comparison with the errors of the channel owing to the collisions between the messages sent by the various terminals, which will therefore lead to a greater number of retransmissions. The time for the transmissions or the retransmissions of lost data should theoretically be reduced due to the elimination of the request/allocation phase, however, this gain is only theoretical since the setting up of a management of the collisions is required, which involves effective access times that are much longer in the case of a high collision rate associated with a high load. Thus, the retransmissions will be much more frequent and the gain in terms of time, due to the elimination of the request/allocation phase, will not be sufficient to compensate for the effective time for access to the resource (imposed by the management of the collisions) nor for the delays associated with these retransmissions. This type of solution does not therefore allow for fully meeting the timing requirements of the safety services, in particular for the management of air traffic, since, even if each aircraft has a very low average traffic, a large number of aircraft must be able to share a limited resource, which necessarily leads to peaks in traffic (at least temporarily). In this case, a large number of collisions results from these peaks in traffic and random access does not allow the timing requirements of the messages to be met, in particular for long messages (for which the probability that a fragment undergoes a collision is higher).

SUMMARY OF THE INVENTION

The aim of the invention is to reduce the time for retransmission of a message so that the satellite communications system allows the compliance with the timing requirements of the services.

More precisely, the invention relates to a communications method for the retransmission of at least one fragment of lost or erroneous message from a terminal (300) to a gateway (302) on a communications network comprising a plurality of terminals, communicating by means of a communications resource over a demand assignment multiple access, the said communications network furthermore comprising a control centre (303) allocating the communications resource to the terminals, the said method being characterized in that it comprises the following steps:

the transmission (31) of a first allocation plan for the communications resources from the control centre (303) to the terminal and to the gateway (302) which stores this allocation plan, the transmission of the message from the terminal to the gateway according to the first allocation plan, the detection (34), by the gateway (302), of fragments of lost or erroneous messages (by the conventional techniques, completed by the stored allocation plan) and, when at least one fragment of lost or erroneous message is detected, the notification (35) by the gateway (302) to the control centre (303) of the loss of at least one fragment of the message, the calculation, by the control centre (303), of a second allocation plan taking into account a new transmission of the fragment of lost or erroneous message, the notification (36) via the gateway (302) to the terminal of the loss of the fragment of message and the notification (36bis) by the control centre (303) to the terminal of the second allocation plan taking into account a new transmission of the lost fragment of message, the transmission (37) by the terminal of the lost fragment of message according to the second allocation plan to the gateway.

Advantageously, the said first allocation plan is transmitted simultaneously to the terminal and to the gateway (302).

Advantageously, each of the messages being identified by a reference in the first allocation plan, during the notification (35) by the gateway (302) to the control centre (303) of the loss of at least one fragment of the message, the gateway also notifies the reference of the lost or erroneous message, coming from the first allocation plan, to the control centre (303).

Advantageously, a message being associated with a timing requirement, the second allocation plan is calculated so as to comply with the timing requirement of the lost message.

Advantageously, the terminal is an aircraft communicating with an air traffic control centre using an air navigation service provider.

The invention also relates to a satellite communications system designed for the implementation of the method according to any one of the preceding claims comprising a gateway (GES) and a control centre for the satellite communications network (NCC) between at least one user segment (UT) and one ground segment (GES and NCC), characterized:

in that the control centre of the satellite communications network (NCC) comprises a means for transmitting to the gateway (GES) and to the terminals an allocation plan for the communications resources between the terminals and a means for calculating an allocation plan for communications resources, in response to a notification of loss or of error in a fragment of message, the allocation plan taking into account a new transmission of the fragment of lost or erroneous message, and in that the gateway (GES) comprises a means of recording said allocation plan for the resources of the communications network, a means for detecting the loss or an error in a fragment of message provided in the allocation plan and a means for informing the control centre (NCC) of the loss or of the error in the fragment of message and of its identification allowing the control centre to deduce transmission requirements for the message.

A first advantage is to reduce the time for retransmission of the data and hence to provide a significant gain in performance because it allows a round trip of a request for capacity and for the associated allocation plan to be avoided.

A second advantage of the invention is that it does not modify the detection mechanism/retransmission of the lost messages. The invention complements this mechanism with the mechanism for re-allocation of the resource for the lost data.

This also allows the constraints for these services to be met which would not be possible without this optimization or without the oversizing of the system coupled with the use of another access technique.

BRIEF DESCRIPTION OF THE DRAWINGS

The invention will be better understood and other advantages will become apparent upon reading the description that follows presented by way of non-limiting example and with regard to the following figures.

DETAILED DESCRIPTION

The invention is applicable to any type of communications system comprising a first segment and a second segment communicating by means of a communications resource shared between the users by virtue of a demand assignment multiple access.

The invention is particularly applicable to a satellite communications system between aircraft and at least one unit on the ground.

The invention may also be applied to a communications system on the ground of the 4G (for $4^{th}$ generation) LTE (for Long Term Evolution) type.

Figure 1:
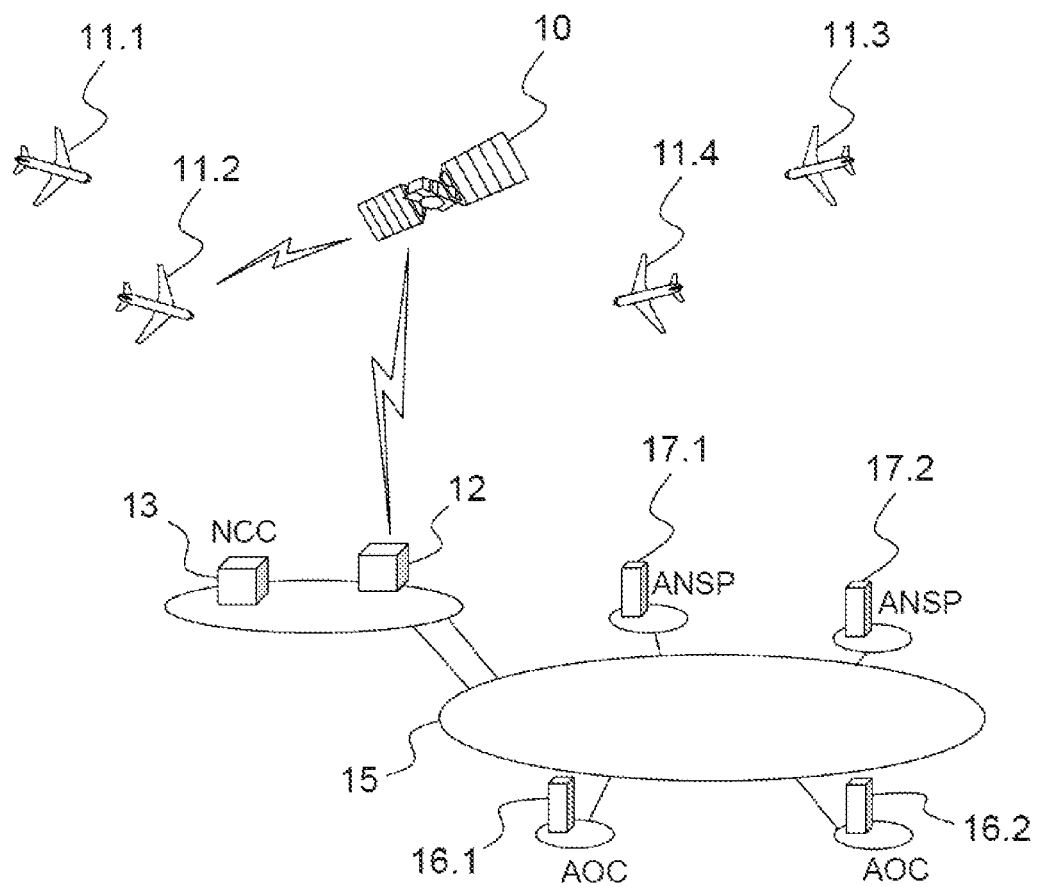
FIG. 1 shows the architecture of an aeronautical communications network incorporating a satellite access network.

The invention will be described hereinbelow on the basis of the example in FIG. 1. The latter shows a satellite communications system between aircraft 11.1, 11.2, 11.3, 11.4, and at least one unit on the ground. The unit on the ground belongs to a terrestrial network ATN linking airline operations centres AOC and air traffic controllers connected to the air traffic management network via air navigation service providers ANSP.

The system uses a satellite communications resource, known as a return channel resource, allowing messages to be transmitted from the aircraft 11.1, 11.2, 11.3, 11.4 to the unit on the ground. Each of the aircraft 11.1, 11.2, 11.3, 11.4 comprises onboard applications and a terminal for communicating with the unit on the ground. The messages sent by the aircraft are associated with services. The following may for example be mentioned: the service COTRAC which allows the pilot and the air traffic controller to coordinate the path of the aircraft in real time. A message from a service, which has a certain size, is associated with a priority and a timing requirement from end-to-end of the communications network.

The communications system comprises a unit 12 responsible for channeling the traffic between the aircraft and the units on the ground (and vice versa). It is via this unit 12, called gateway in the rest of the description, that all the messages exchanged between the aircraft and the units on the ground transit.

The communications system also comprises a control centre NCC 13 responsible for sharing the satellite communications resource between the aircraft (whose number may be greater than several thousands). In order to easily be able to divide the communications resource between the aircraft, the latter undergoes a time division into frames. Each frame is, in turn, divided up into time slots. An allocation plan allocates time slots for the transmission of the messages.

The gateway 12 transmits the messages to the terrestrial network ATN linking the airline operations centres AOC and the air traffic controllers connected to the air traffic management network via the air navigation service providers ANSP.

Usually, the gateway 12 and the control centre NCC 13 can be located in the same establishment, but according to another architecture, these two entities may be located at different places.

In this second case, a terrestrial communications network is considered between these two entities with a propagation delay that is short compared with the satellite delay.

Figure 2:
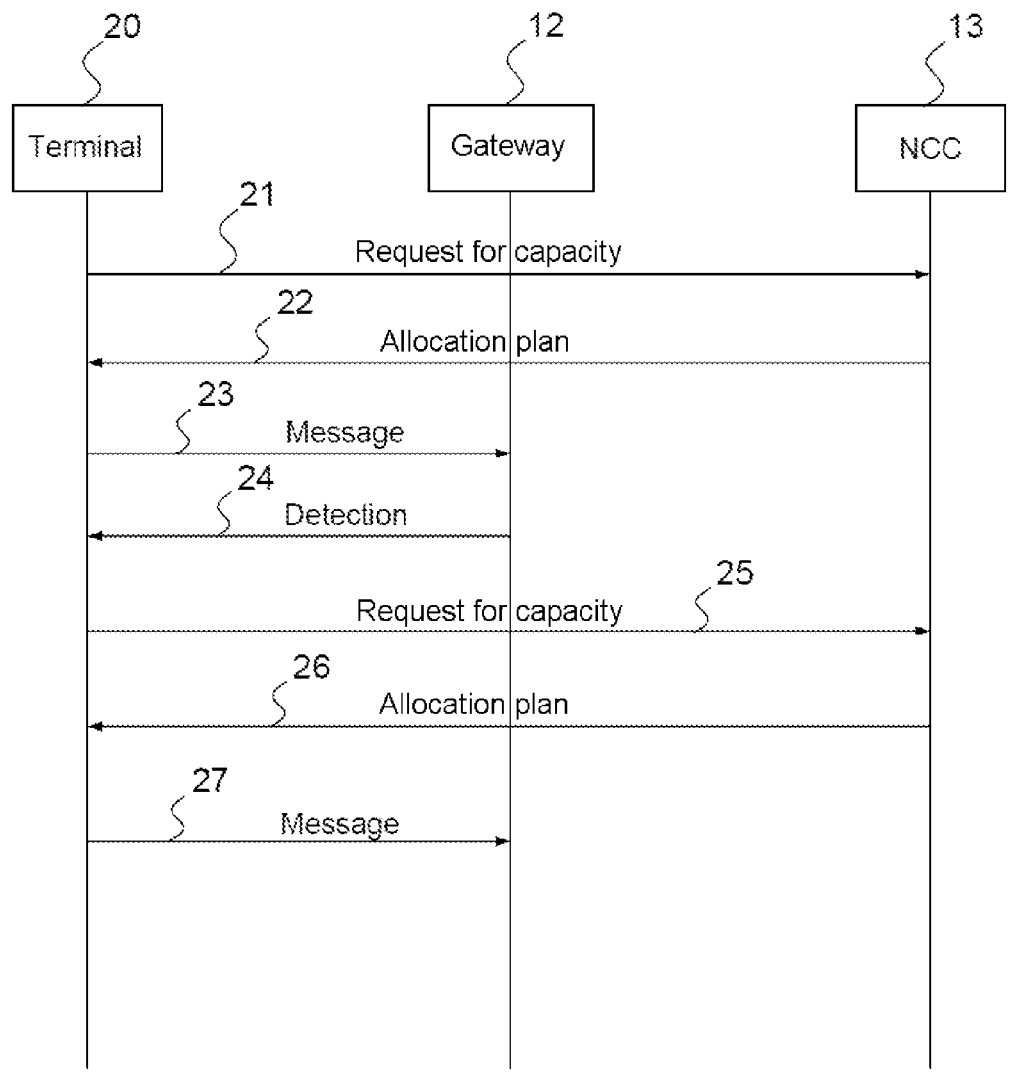
FIG. 2 shows the steps of a satellite communications method of a usual solution of the prior art.

A usual method of the prior art for the transmission of a message coming from a terminal user 11.1, 11.2, 11.3, 11.4 is shown in FIG. 2. This method illustrates the case of the transmission of data when a fragment of message or an entire message is lost. This method is described in more detail by FIG. 2. Preliminary steps for transmission of data and for an error detection mechanism are identical in the method according to the invention.

For the transmission of a message over the satellite communications network, the known method comprises a first step 21 for the sending, by the first terminal 11.2, of a request for capacity for at least one message, the request indicating the size of the message, and in the case of the use of a method of allocation such as described in the French patent application FR1000804, a time reference indicating the date of reception of the message by the terminal and, where relevant, the timing requirement from end-to-end of the communications network associated with the message, and a priority associated with the message. In practice, the request for capacity can contain information on the type of service associated with the message. The service then implicitly indicates the priority and the timing requirement of the message. The request is sent to the control centre NCC 13 in charge of the distribution of the resource between the aircraft 11.1, 11.2, 11.3, 11.4.

In response to the request for capacity, the control centre NCC 13 for the communications resource allocates a communications resource to the terminal from which the request originates (in the form of time slots). In the case of the use of a method of allocation such as described in the French patent application FR1000804, this allocation is determined by performing a calculation of an ordering of the messages by taking into account the time reference and the timing requirement associated with the messages.

Subsequently, at a second step 22, the control centre NCC 13 broadcasts an allocation plan determined based on the calculated ordering of the messages to the terminals of the aircraft.

In practice, the control centre NCC continuously receives requests for capacity originating from the various aircraft. At regular intervals, it calculates an ordering of the various messages. Then, an allocation plan is determined from this ordering. The allocation plan defines which is the terminal that has the right to transmit over the communications resource for a give period of time (one or more time slots). The ordering and the allocation plan are recalculated, for example, every second taking into account the new capacity requests.

Once the user has been made aware of the communications resource that has been assigned to him (in other words, the corresponding time slots) at a step 23, the latter sends its message within the interval of time allocated.

When a loss of the message or of a fragment occurs, a detection mechanism 24 implemented by the gateway in collaboration with the terminal allows the latter to be informed of the loss of the message. A common technique for detection of the errors in transmission of fragments or messages consists, for the gateway, in acknowledging all of the fragments received. After a certain time (which must be minimized for efficiency of the mechanism), if the terminal has not received any acknowledgement, it considers the fragment as being lost and renews the process of transmission for this fragment. The terminal may also receive an acknowledgement indicating to it the fragments which have been received and it can therefore deduce from this those which have not been received (the last fragments lost cannot however be detected by this method). This type of detection is henceforth categorized as implicit. The user must then reproduce the first steps of the method, a step for transmission of a request for capacity 25 in order to obtain a new communications resource, a wait step for a new allocation plan 26 and a step for retransmission 27 of the message to the gateway (GES).

According to the invention, the detection may also be based on the allocation plan previously stored by the gateway (non-reception of an expected fragment) which informs the control centre of a loss of at least one fragment of a message in addition to the implementation of the mechanisms for error recovery (of the ARQ type). This type of detection is henceforth categorized as explicit.

Figure 3:
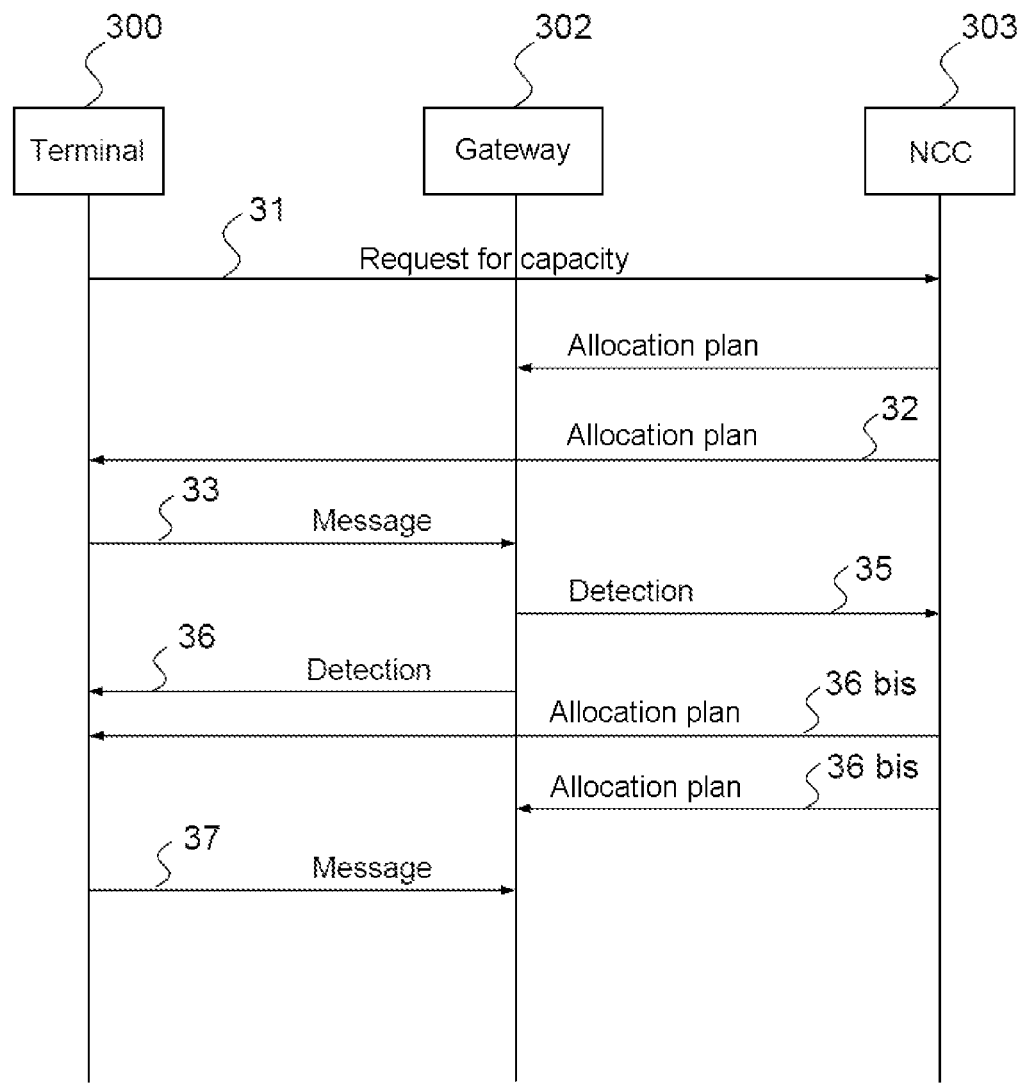
FIG. 3 shows the steps of the satellite communications method according to the invention.

FIG. 3 shows the method according to the invention. In an identical manner to the known method, the method comprises, for the transmission of a message over the satellite communications network, a first step 31 for sending, from the terminal 300, a request for capacity for at least one message to the control centre NCC 303.

Subsequently, at a second step 32, the control centre NCC 303 broadcasts to the terminals of the aircraft an allocation plan determined based on the calculated ordering of the messages. According to an essential feature of the invention, this allocation plan is also transmitted to the gateway 302.

In practice, the control centre NCC 13 continuously receives requests for capacity originating from the various aircraft. At regular intervals, it calculates an ordering of the various messages. Then, an allocation plan is determined from this ordering. The allocation plan defines which is the terminal that has the right to transmit over the communications resource for a given period of time (one or more time slots). The ordering and the allocation plan are recalculated, for example, every second taking into account the new requests for capacities. This allocation plan is also transmitted periodically to the gateway 302.

Once the user has been made aware of the communications resource assigned to him (in other words, the corresponding time slots), at a step 33, the latter sends its message within the interval of time allocated.

When a loss of the message or of a fragment 34 occurs, as previously described, the detection mechanism implemented by the gateway in collaboration with the terminal allows the latter to be informed of the loss of the message. In addition, according to the invention, the gateway is aware of the allocation plan, the latter having been communicated during the preceding step 32, and is capable of detecting and of identifying the lost or erroneous messages or fragments.

At a step 35, the gateway 302 indicates to the control centre of the communications network NCC 303 which message or fragment has been lost. Since the control centre has conserved the characteristics and the requirements of the lost message, as of this step of the method, it 303 can position in the allocation plan the communications resources necessary for a new transmission of the lost message (or of the fragment of message), in such a manner that the timing requirements for each of the messages are met. The compliance with the timing requirements of each of the messages requires the use of a method of allocation such as that described in the French patent application FR1000804.

Consequently, at the step 36 for informing the terminal, the latter is informed (implicitly or explicitly) by the gateway 302 of the loss of the message previously sent and, in parallel, the control centre NCC 303 informs (36b) the terminal of the availability of a new communications resource positioned in the allocation plan such that the initial requirements of the message are met. By virtue of this information, the user is able to immediately retransmit his message which had been lost without reformulating a request for capacity and without losing the wait time for a new request for capacity and for a new allocation plan. The detection of the loss of the message by the terminal and the sending of the information (sent by the control centre NCC 303), indicating the availability of a new communications resource for retransmitting the message, are synchronized such that the user does not need to send a request for reservation of a resource for retransmitting the lost message.

It goes without saying that, if one or more messages/fragments have been lost during the first transmission, the new allocation plan transmitted at the step 36 comprises one or more communications resources, temporally successive or disjoint, allowing the requirements of each of the messages to be met.

According to one improved variant embodiment of the invention, the calculation of the allocation plan can be carried out according to the method such as claimed in the French patent application FR1000804. Furthermore, the calculation of the allocation plan can be computed according to any one of the variant embodiments of this method. In practice, each time that the gateway 202 informs the control centre NCC 203 of the loss of a message, the latter generates a request for capacity taking into account the size of the message, the timing requirement associated with the message and the time reference of arrival of the message in the system. The priority of such a request is generally very high in the case of the use of the method such as claimed in the French patent application FR1000804, since it is necessarily closer to the expiration of the period of validity of the message imposed by the timing requirement associated with this message (owing to the initial loss of the message).

The main advantage of the invention is that it allows the time for retransmission of the lost data over the channel to be minimized when a demand assignment access is used. Moreover, it does not modify the existing mechanisms allowing the detection and the retransmission of data lost over the channel. Thus, it will allow the end-to-end times for the messages sent in the framework of the management of the air traffic to be minimized.

When the method is associated with an optimized allocation of the resource such as that described in the French patent application FR1000804, the time-related characteristics of each message are taken into account in such a manner that it complies with the timing requirements of the service to which it belongs, when this is possible. This solution therefore allows a resource to be shared between a larger number of terminals, while at the same time maintaining compliance with the timing requirements of all of their services.

The gain in terms of time corresponds as a minimum to a request/allocation round trip (or RTT: Round Trip Time) over the satellite link for each retransmission of message or of fragment of message to which must be added the gain in the optimized allocation (such as that described in the French patent application FR1000804) which furthermore allows close to twice the number of terminals to be accepted over a constant resource while meeting the timing requirements for all of their services. The gain in a satellite RTT corresponds to the total time needed for the terminal to make a request for capacity when it is aware of the loss of one of these messages or a fragment (as a minimum one satellite uplink) to which must be added the total time needed for the transmission of the allocation plan (as a minimum one additional satellite uplink). This gain in a satellite RTT (around 500 ms not including the processing time) for the transmission of the messages is not negligible compared with the end-to-end time requirements of some services which correspond for the shortest of them to values between 1.4 s and 2.4 s. This gain in terms of performance allows an improved use of the resources, and hence allows a larger number of terminals to be accepted, for which the timing requirements of all of their services will be met, over a constant resource.

The invention is applicable to satellite communications systems used for the management of air traffic, and more generally, to any satellite communications system constrained by stringent requirements for quality of service, in terms of time for message delivery and of reliability.

The invention claimed is:

1. A communications method for the retransmission of at least one fragment of lost or erroneous message from a terminal to a gateway on a communications network comprising a plurality of terminals, communicating by means of a communications resource over a demand assignment multiple access, said communications network further comprising a control centre allocating the communications resource to the terminals, said method comprising:
   transmission of a first allocation plan for the communications resources from the control centre to the terminal and to the gateway,
   transmission of the message from the terminal to the gateway according to the first allocation plan,
   detection, by the gateway, of fragments of lost or erroneous messages and, when at least one fragment of lost or erroneous message is detected, the notification via the gateway to the control centre of the loss of at least one fragment of the message,
   calculation, by the control centre, of a second allocation plan taking into account a new transmission of the fragment of lost or erroneous message,
   notification via the gateway to the terminal of the loss of the fragment of message and the notification by the control centre to the terminal of the second allocation plan taking into account a new transmission of the lost fragment of message, and
   transmission by the terminal of the lost fragment of message according to the second allocation plan to the gateway.

2. The method according to claim 1, in which, during the step for transmission of the first allocation plan, said first allocation plan is transmitted simultaneously to the terminal and to the gateway.

3. The method according to claim 2, in which, each of the messages being identified by a reference in the first allocation plan, during the notification by the gateway to the control centre of the loss of at least one fragment of the message, the gateway also notifies the reference of the lost or erroneous message, coming from the first allocation plan, to the control centre.

4. The method according to claim 3, in which, a message being associated with a timing requirement, the second allocation plan is calculated so as to comply with the timing requirement of the lost message.

5. The method according to claim 4, in which the terminal is an aircraft communicating with an air traffic control centre using an air navigation service provider.

6. The method according to claim 3, in which the terminal is an aircraft communicating with an air traffic control centre using an air navigation service provider.

7. The method according to claim 2, in which, a message being associated with a timing requirement, the second allocation plan is calculated so as to comply with the timing requirement of the lost message.

8. The method according to claim 7, in which the terminal is an aircraft communicating with an air traffic control centre using an air navigation service provider.

9. The method according to claim 2, in which the terminal is an aircraft communicating with an air traffic control centre using an air navigation service provider.

10. The method according to claim 1, in which, each of the messages being identified by a reference in the first allocation plan, during the notification by the gateway to the control centre of the loss of at least one fragment of the message, the gateway also notifies the reference of the lost or erroneous message, coming from the first allocation plan, to the control centre.

11. The method according to claim 10, in which, a message being associated with a timing requirement, the second allocation plan is calculated so as to comply with the timing requirement of the lost message.

12. The method according to claim 11, in which the terminal is an aircraft communicating with an air traffic control centre using an air navigation service provider.

13. The method according to claim 10, in which the terminal is an aircraft communicating with an air traffic control centre using an air navigation service provider.

14. The method according to claim 1, in which, a message being associated with a timing requirement, the second allocation plan is calculated so as to comply with the timing requirement of the lost message.

15. The method according to claim 14, in which the terminal is an aircraft communicating with an air traffic control centre using an air navigation service provider.

16. The method according to claim 1, in which the terminal is an aircraft communicating with an air traffic control centre using an air navigation service provider.

17. A satellite communications system designed for the implementation of the method according to claim 1 comprising a gateway and a control centre for the satellite communications network between at least one user segment and one ground segment,
   wherein the control centre of the satellite communications network comprises a means for transmitting to the gateway and to the terminals an allocation plan for the communications resources between the terminals and a means for calculating an allocation plan for communications resources, in response to a notification of loss or of error in a fragment of message, the allocation plan taking into account a new transmission of the fragment of lost or erroneous message,
   wherein the gateway comprises a means of recording said allocation plan for the resources of the communications network, a means for detecting the loss or an error in a fragment of message provided in the allocation plan and a means for informing the control centre of the loss or of the error in the fragment of message and of its identification allowing the control centre to deduce transmission requirements for the message.

* * * * *